(12) United States Patent
Yang

(10) Patent No.: US 11,234,133 B2
(45) Date of Patent: Jan. 25, 2022

(54) FREQUENCY REUSE METHOD AND RELATED APPARATUS

(71) Applicant: Huawei Technologies Co., Ltd., Shenzhen (CN)

(72) Inventor: Xun Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 590 days.

(21) Appl. No.: 15/436,553

(22) Filed: Feb. 17, 2017

(65) Prior Publication Data
US 2017/0164205 A1 Jun. 8, 2017

Related U.S. Application Data

(63) Continuation of application No. PCT/CN2014/084892, filed on Aug. 21, 2014.

(51) Int. Cl.
*H04W 16/02* (2009.01)
*H04W 16/04* (2009.01)
*H04W 72/04* (2009.01)

(52) U.S. Cl.
CPC ........... *H04W 16/04* (2013.01); *H04W 16/02* (2013.01); *H04W 72/042* (2013.01); *H04W 72/0413* (2013.01)

(58) Field of Classification Search
CPC ............. H04W 16/04; H04W 72/0413; H04W 72/042; H04W 28/18; H04W 72/048; H04W 72/04; H04L 5/0007; H04L 5/003
See application file for complete search history.

(56) References Cited

U.S. PATENT DOCUMENTS 7,120,791 B2 10/2006 Volpano et al.
9,451,467 B1 9/2016 Vrzic et al.
(Continued)

FOREIGN PATENT DOCUMENTS

CN 101406080 A 4/2009
CN 101707596 A 5/2010
(Continued)

OTHER PUBLICATIONS

IEEE Standards Association, Part 11: Wireless LAN Medium Access Contol (MAC) and Physical Layer (PHY) Specifications, IEEE Computer Society, IEEE Std. 802.11-2012 (Revision of IEEE Std. 802.11-2007), New York, NY, Mar. 29, 2012, 2793 pages.

*Primary Examiner* — Barry W Taylor
(74) *Attorney, Agent, or Firm* — Leydig, Voit & Mayer, Ltd.

(57) ABSTRACT

Embodiments of the present invention provide a frequency reuse method and a related apparatus. The method in the embodiments of the present invention includes: sending, by an access point, a first message to a station, where the first message carries indication information indicating that a basic service set is in a fractional frequency reuse mode; receiving, by the access point, a second message sent by the station, where the second message carries indication information indicating that the station supports the fractional frequency reuse mode; and communicating, by the access point, with the station in the fractional frequency reuse mode after the access point determines, according to the second message, that the station supports the fractional frequency reuse mode. In the embodiments of the present invention, frequency interference in a Wi-Fi network can be effectively reduced.

12 Claims, 8 Drawing Sheets

(56) References Cited

U.S. PATENT DOCUMENTS

| | | | |
|---|---|---|---|
| 2009/0086672 A1* | 4/2009 | Gholmieh | H04W 48/14 370/329 |
| 2010/0208610 A1 | 8/2010 | Ihm et al. | |
| 2011/0013608 A1 | 1/2011 | Lee et al. | |
| 2011/0110349 A1* | 5/2011 | Grandhi | H04W 52/04 370/338 |
| 2011/0116489 A1 | 5/2011 | Grandhi | |
| 2011/0195732 A1* | 8/2011 | Kim | H04L 5/0037 455/509 |
| 2012/0039215 A1 | 2/2012 | Seok | |
| 2012/0157155 A1 | 6/2012 | Cho et al. | |
| 2014/0185559 A1 | 7/2014 | Grandhi | |
| 2015/0080003 A1* | 3/2015 | Sadek | H04W 72/085 455/452.1 |
| 2015/0117180 A1* | 4/2015 | Gupta | H04L 41/0663 370/221 |
| 2016/0073429 A1* | 3/2016 | Oteri | H04W 4/08 370/338 |
| 2017/0078887 A1* | 3/2017 | Barriac | H04W 16/10 |
| 2019/0208423 A1* | 7/2019 | Cherian | H04W 16/10 |

FOREIGN PATENT DOCUMENTS

| | | |
|---|---|---|
| CN | 101884241 A | 11/2010 |
| CN | 102326341 A | 1/2012 |
| CN | 102577538 A | 7/2012 |
| CN | 102598745 A | 7/2012 |
| CN | 102598769 A | 7/2012 |
| CN | 103987110 A | 8/2014 |
| WO | 2006068370 A1 | 6/2006 |
| WO | 2011060310 A1 | 5/2011 |

\* cited by examiner

FREQUENCY REUSE METHOD AND RELATED APPARATUS

CROSS-REFERENCE TO RELATED APPLICATIONS

This application is a continuation of International Application No. PCT/CN2014/084892, filed on Aug. 21, 2014, the disclosure of which is hereby incorporated by reference in its entirety.

TECHNICAL FIELD

The present invention relates to the field of wireless communications, and in particular, to a frequency reuse method and a related apparatus.

BACKGROUND

In a wireless communications network, a most important impact factor is interference. A capacity of the entire network is limited because of mutual interference between various neighboring cells in the network. With development of wireless communications, various interference processing methods are invented, so as to resolve interference problems in different scenarios. There are many interference processing methods such as interference avoidance, interference alignment, coordinated transmission, and coordinated beamforming. The interference avoidance is a simplest and easiest-to-implement method.

An original interference avoidance method is frequency reuse, that is, non-overlapping frequency bands are used in neighboring cells, so as to minimize co-channel interference from another cell by using a four color theorem and by means of network planning. However, usage of a frequency resource is not high in this manner.

Fractional frequency reuse is a simple improvement method of the frequency reuse. To put it simply, a cell is divided into a center region and an edge region (the cell is even further divided into an edge region and an overlapping area), and frequency bands of the center region and the edge region are different. A common means is that a same frequency band is used in a center region of each cell and power of the center region is reduced, and a frequency band that does not overlap that used in another cell is used in an edge region, so as to implement interference avoidance. In addition, if neighboring cells can coordinate, frequency bands of adjacent regions may be the same, so that a base station provides a user in an edge region with a service of a larger capacity by using an advanced signal processing technology.

In a current Wi-Fi (Wireless Fidelity, Wireless Fidelity) network, a CSMA with CA (Carrier Sense Multiple Access with Collision Avoidance) protocol is used to avoid a collision during data transfer, so as to avoid particular interference.

However, in a case of dense deployment, co-channel interference is still very serious when a same radio frequency is used to transmit and receive a Wi-Fi signal.

SUMMARY

Embodiments of the present invention provide a frequency reuse method and a related apparatus, so as to reduce frequency interference in a Wi-Fi network.

A first aspect of the embodiments of the present invention provides an access point device, including:

a first sending unit, configured to send a first message to a station, where the first message carries indication information indicating that a basic service set is in a fractional frequency reuse mode;

a first receiving unit, configured to receive a second message sent by the station, where the second message carries indication information indicating that the station supports the fractional frequency reuse mode; and an execution unit, configured to communicate with the station in the fractional frequency reuse mode after determining, according to the second message received by the receiving unit, that the station supports the fractional frequency reuse mode.

With reference to the first aspect of the embodiments of the present invention, in a first implementation manner of the first aspect of the embodiments of the present invention, the access point device further includes:

a scanning unit, configured to scan a channel, so as to obtain frequency reuse information of each basic service set surrounding an access point; and a determining unit, configured to determine a frequency reuse manner of the access point according to a reuse policy and the frequency reuse information that is of each basic service set surrounding the access point and that is obtained by the scanning unit, where the reuse policy is a frequency allocation manner used by the access point to maximize a throughput of a basic service set or to maximize a quantity of supported users in an overlapping area of a basic service set.

With reference to the first implementation manner of the first aspect of the embodiments of the present invention, in a second implementation manner of the first aspect of the embodiments of the present invention, the determining unit is specifically configured to: when an orthogonal frequency allocation solution is used for the overlapping area, allocate a frequency band that does not overlap that of each basic service set surrounding the access point for the access point and an overlapping area of each basic service set surrounding the access point; or the determining unit is specifically configured to: when a solution of coordination between at least two basic service sets is used for the overlapping area, allocate an operating frequency band the same as that of each basic service set surrounding the access point for the access point and an overlapping area of each basic service set surrounding the access point.

With reference to the first implementation manner of the first aspect of the embodiments of the present invention, in a third implementation manner of the first aspect of the embodiments of the present invention, the access point device further includes:

a second receiving unit, configured to receive a third message sent by the station, where the third message carries frequency reuse information of each basic service set surrounding the station;

an adjustment unit, configured to adjust the frequency reuse manner of the access point according to the reuse policy, the frequency reuse information of each basic service set surrounding the access point, and the third message; and a second sending unit, configured to send, to the station, a parameter of a frequency reuse manner that is of the access point and that is adjusted by the adjustment unit.

With reference to the first aspect of the embodiments of the present invention, or the first implementation manner of the first aspect, or the second implementation manner of the first aspect, or the third implementation manner of the first aspect, in a fourth implementation manner of the first aspect of the embodiments of the present invention, the basic service set includes at least two virtual basic service sets, each virtual basic service set is corresponding to one virtual basic service set identifier, the virtual basic service set is corresponding to an operating frequency band of the access point, the virtual basic service set identifier is associated with a real basic service set identifier, and the real basic service set identifier is a Media Access Control MAC address of the access point.

A second aspect of the embodiments of the present invention provides a station device, including:

a receiving module, configured to receive a first message sent by an access point, where the first message carries indication information indicating that a basic service set is in a fractional frequency reuse mode;

a first sending module, configured to send a second message to the access point, where the second message carries indication information indicating that a station supports the fractional frequency reuse mode; and an execution module, configured to communicate with the access point in the fractional frequency reuse mode after the access point determines, according to the second message sent by the first sending module, that the station supports the fractional frequency reuse mode.

With reference to the second aspect of the embodiments of the present invention, in a first implementation manner of the second aspect of the embodiments of the present invention, the station device further includes:

a second sending module, configured to send a third message to the access point, where the third message carries frequency reuse information of each basic service set surrounding the station; and an obtaining module, configured to obtain a parameter of a frequency reuse manner that is of the access point and that is adjusted by the access point, where the parameter of the frequency reuse manner of the access point is adjusted by the access point according to scanned frequency reuse information of each basic service set surrounding the access point, a reuse policy, and the third message, and the reuse policy is a frequency allocation manner used by the access point to maximize a throughput of a basic service set or to maximize a quantity of supported users in an overlapping area of a basic service set.

With reference to the second aspect of the embodiments of the present invention, or the first implementation manner of the second aspect, in a second implementation manner of the second aspect of the embodiments of the present invention, the basic service set includes at least two virtual basic service sets, each virtual basic service set is corresponding to one virtual basic service set identifier, the virtual basic service set is corresponding to an operating frequency band of the access point, the virtual basic service set identifier is associated with a real basic service set identifier, and the real basic service set identifier is a Media Access Control MAC address of the access point.

A third aspect of the embodiments of the present invention provides a frequency reuse method, including:

sending, by an access point, a first message to a station, where the first message carries indication information indicating that a basic service set is in a fractional frequency reuse mode;

receiving, by the access point, a second message sent by the station, where the second message carries indication information indicating that the station supports the fractional frequency reuse mode; and communicating, by the access point, with the station in the fractional frequency reuse mode after the access point determines, according to the second message, that the station supports the fractional frequency reuse mode.

With reference to the third aspect of the embodiments of the present invention, in a first implementation manner of the third aspect of the embodiments of the present invention, before the sending, by an access point, a first message to a station, the method includes:

scanning, by the access point, a channel, so as to obtain frequency reuse information of each basic service set surrounding the access point; and determining, by the access point, a frequency reuse manner of the access point according to a reuse policy and the obtained frequency reuse information of each basic service set surrounding the access point, where the reuse policy is a frequency allocation manner used by the access point to maximize a throughput of a basic service set or to maximize a quantity of supported users in an overlapping area of a basic service set.

With reference to the first implementation manner of the third aspect of the embodiments of the present invention, in a second implementation manner of the third aspect of the embodiments of the present invention, the determining a frequency reuse manner of the access point includes:

when an orthogonal frequency allocation solution is used for the overlapping area, allocating a frequency band that does not overlap that of each basic service set surrounding the access point for the access point and an overlapping area of each basic service set surrounding the access point; or when a solution of coordination between at least two basic service sets is used for the overlapping area, allocating an operating frequency band the same as that of each basic service set surrounding the access point for the access point and an overlapping area of each basic service set surrounding the access point.

With reference to the first implementation manner of the third aspect of the embodiments of the present invention, in a third implementation manner of the third aspect of the embodiments of the present invention, the method further includes:

receiving, by the access point, a third message sent by the station, where the third message carries frequency reuse information of each basic service set surrounding the station;

adjusting, by the access point, the frequency reuse manner of the access point according to the reuse policy, the frequency reuse information of each basic service set surrounding the access point, and the third message; and sending, by the access point and to the station, a parameter of a frequency reuse manner that is of the access point and that is adjusted.

With reference to the third aspect of the embodiments of the present invention, or the first implementation manner of the third aspect, or the second implementation manner of the third aspect, or the third implementation manner of the third aspect, in a fourth implementation manner of the third aspect of the embodiments of the present invention, the basic service set includes at least two virtual basic service sets, each virtual basic service set is corresponding to one virtual basic service set identifier, the virtual basic service set is corresponding to an operating frequency band of the access point, the virtual basic service set identifier is associated with a real basic service set identifier, and the real basic service set identifier is a Media Access Control MAC address of the access point.

A fourth aspect of the embodiments of the present invention provides a frequency reuse method, including:

receiving, by a station, a first message sent by an access point, where the first message carries indication information indicating that a basic service set is in a fractional frequency reuse mode;

sending, by the station, a second message to the access point, where the second message carries indication information indicating that the station supports the fractional frequency reuse mode; and communicating, by the station, with the access point in the fractional frequency reuse mode after the access point determines, according to the second message, that the station supports the fractional frequency reuse mode.

With reference to the fourth aspect of the embodiments of the present invention, in a first implementation manner of the fourth aspect of the embodiments of the present invention, the method further includes:

sending, by the station, a third message to the access point, where the third message carries frequency reuse information of each basic service set surrounding the station; and obtaining, by the station, a parameter of a frequency reuse manner that is of the access point and that is adjusted by the access point, where the parameter of the frequency reuse manner of the access point is adjusted by the access point according to scanned frequency reuse information of each basic service set surrounding the access point, a reuse policy, and the third message, and the reuse policy is a frequency allocation manner used by the access point to maximize a throughput of a basic service set or to maximize a quantity of supported users in an overlapping area of a basic service set.

With reference to the fourth aspect of the embodiments of the present invention, or the first implementation manner of the fourth aspect, in a second implementation manner of the fourth aspect of the embodiments of the present invention, the basic service set includes at least two virtual basic service sets, each virtual basic service set is corresponding to one virtual basic service set identifier, the virtual basic service set is corresponding to an operating frequency band of the access point, the virtual basic service set identifier is associated with a real basic service set identifier, and the real basic service set identifier is a Media Access Control MAC address of the access point.

It can be learned from the foregoing technical solutions that the embodiments of the present invention have the following advantage:

In the embodiments of the present invention, after an access point determines, according to a second message, that a station supports a fractional frequency reuse mode, the access point communicates with the station in the fractional frequency reuse mode, so that the station operates in the fractional frequency reuse mode, which effectively reduces frequency interference in a Wi-Fi network.

DETAILED DESCRIPTION

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

Figure 1:
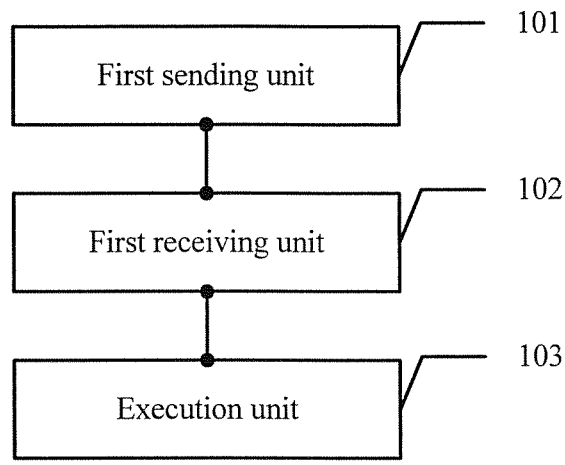
FIG. 1 is a schematic structural diagram of an embodiment of an access point device according to an embodiment of the present invention.

Referring to FIG. 1, an embodiment of an access point device according to an embodiment of the present invention includes:

a first sending unit 101, configured to send a first message to a station, where the first message carries indication information indicating that a basic service set (BSS) is in a fractional frequency reuse mode;

a first receiving unit 102, configured to receive a second message sent by the station, where the second message carries indication information indicating that the station supports the fractional frequency reuse mode; and an execution unit 103, configured to communicate with the station in the fractional frequency reuse mode after determining, according to the second message received by the foregoing first receiving unit 102, that the station supports the fractional frequency reuse mode.

It should be noted that the foregoing BSS includes at least two virtual BSSs; each virtual BSS is corresponding to a virtual BSSID (Basic Service Set Identifier, basic service set identifier), and the virtual BSS is corresponding to an operating frequency band of an access point; the virtual BSSID is associated with a real BSSID, and the real BSSID is a MAC (Media Access Control) address of the access point.

The foregoing first message includes a field, where the field is used to indicate that the BSS is in the fractional frequency reuse mode, and the fractional frequency reuse mode is implemented by using the at least two virtual BSSs and operating frequency bands corresponding to the virtual BSSs. The first message may be a beacon frame of one information bit or another management frame.

That the station supports the fractional frequency reuse mode indicates that the station can identify that the BSS is in the fractional frequency reuse mode, and obtain frequency band information corresponding to the BSS.

In this embodiment of the present invention, a first sending unit 101 sends a first message to a station, where the first message carries indication information indicating that a BSS is in a fractional frequency reuse mode; a first receiving unit 102 receives a second message sent by the station, where the second message carries indication information indicating that the station supports the fractional frequency reuse mode; and an execution unit 103 performs a step of communicating with the station in the fractional frequency reuse mode after determining, according to the second message received by the foregoing first receiving unit 102, that the station supports the fractional frequency reuse mode, so that the station operates in the fractional frequency reuse mode, which effectively reduces frequency interference in a Wi-Fi network.

Figure 2:
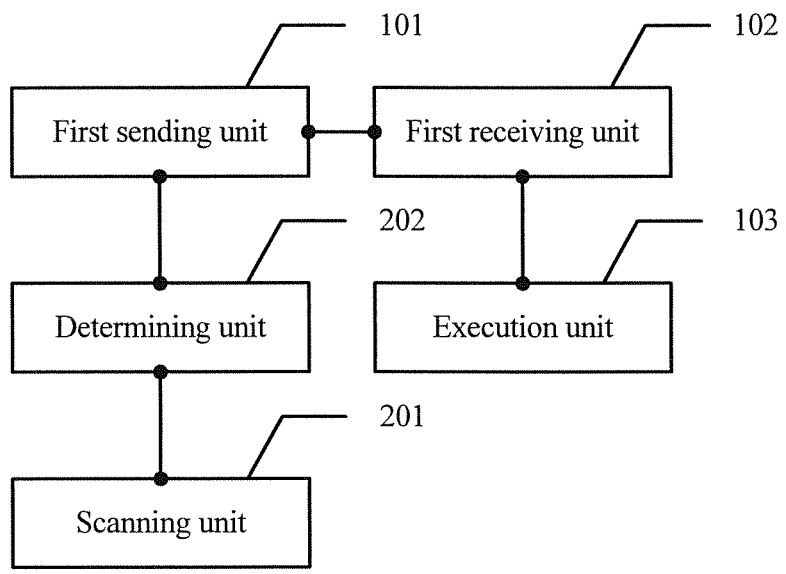
FIG. 2 is a schematic structural diagram of another embodiment of an access point device according to an embodiment of the present invention.

In the foregoing embodiment, the access point device may initialize a frequency reuse manner of the access point according to a reuse policy and frequency reuse information of each basic service set surrounding the access point. Optionally, as shown in FIG. 2, the foregoing access point device further includes:

a scanning unit 201, configured to scan a channel, so as to obtain the frequency reuse information of each basic service set surrounding the access point; and a determining unit 202, configured to determine a frequency reuse manner of the access point according to the reuse policy and the frequency reuse information that is of each basic service set surrounding the access point and that is obtained by the foregoing scanning unit 201, where the reuse policy is a frequency allocation manner used by the access point to maximize a throughput of a basic service set or to maximize a quantity of supported users in an overlapping area of a basic service set.

It should be noted that the scanning unit 201 scans the operating channel, so as to obtain the frequency reuse information of each BSS surrounding the access point. It may be understood that the frequency reuse information of each BSS surrounding the access point may be obtained in many manners. For example, the frequency reuse information may be obtained by detecting a signal sent by an access point or a station of each surrounding BSS, where the signal carries a related information field. A manner of obtaining or indicating the frequency reuse information is not limited herein.

The foregoing frequency reuse information includes operating frequency bands of at least two virtual BSSs and a correspondence between a virtual BSSID and a real BSSID. The foregoing reuse policy refers to a frequency allocation method used by the access point to maximize a throughput of a BSS of the access point or to maximize a quantity of supported users in a current OBSS (Overlapping Basic Service Set) environment. Therefore, different reuse policies have different reuse methods. Common methods include but are not limited to the following rules:

If an orthogonal frequency allocation solution is used for the overlapping area, a frequency band that does not overlap that of an adjacent BSS is used for data transmitted by a station in an overlapping area between the BSS and the adjacent BSS; or if a solution of coordination between at least two BSSs is used for the overlapping area, an operating frequency band the same as that of an adjacent BSS is allocated for an overlapping area between the BSS and the adjacent BSS.

The foregoing overlapping area refers to an overlapping area between a real BSS (and a virtual BSS of the real BSS) and another real BSS (and a virtual BSS of the another real ESS).

Based on either of the foregoing two common methods, the reuse policy further includes the following content:

A frequency band used in a center region is determined by each access point; and there is at least one primary channel on an operating frequency band of each virtual BSS.

With reference to the foregoing frequency reuse information and specific content of the reuse policy, an access point in the OBSS environment can effectively initialize a frequency reuse manner of the access point, and therefore a quantity of virtual BSSs and an operating frequency band of each virtual BSS can be determined.

In this embodiment of the present invention, a determining unit 202 initializes a frequency reuse manner of an access point according to a reuse policy and frequency reuse information that is of each BSS surrounding the access point and that is obtained by a scanning unit 201, and therefore a quantity of virtual BSSs and operating frequency bands of the virtual BSSs are determined, so as to provide a flexible and compatible fractional frequency reuse mode.

Figure 3:
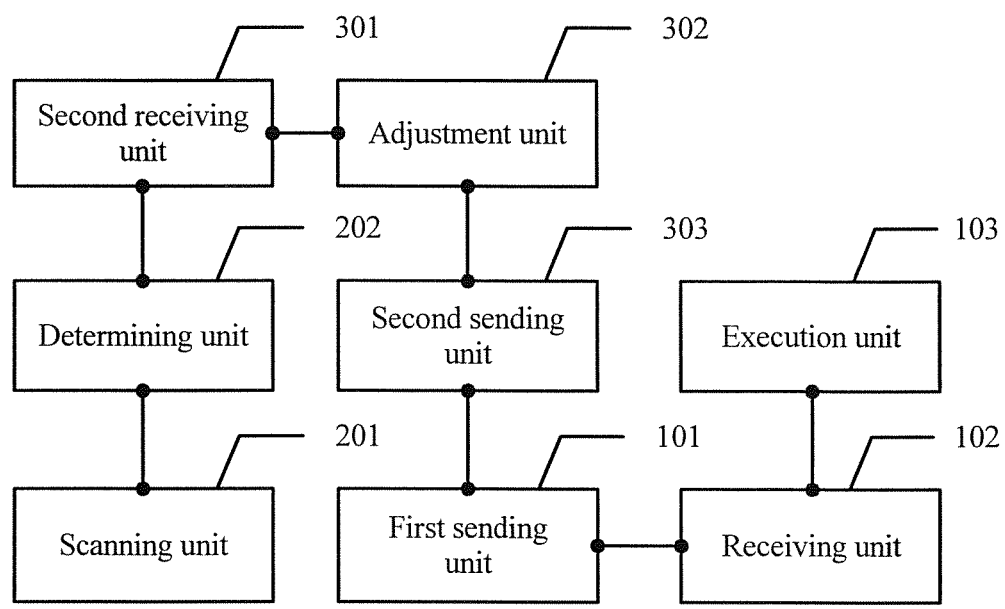
FIG. 3 is a schematic structural diagram of another embodiment of an access point device according to an embodiment of the present invention.

Based on the access point device in the foregoing embodiments, in this embodiment of the present invention, the frequency reuse manner of the access point may be further adjusted. Optionally, as shown in FIG. 3, the foregoing access point device further includes:

a second receiving unit 301, configured to receive a third message sent by the station, where the third message carries frequency reuse information of each basic service set surrounding the station;

an adjustment unit 302, configured to adjust the frequency reuse manner of the access point according to the foregoing reuse policy, the frequency reuse information of each basic service set surrounding the access point, and the foregoing third message; and a second sending unit 303, configured to send, to the station, a parameter of a frequency reuse manner that is of the access point and that is adjusted by the foregoing adjustment unit.

It should be noted that the foregoing third message is an extended neighbor report periodically sent by the station to the access point, and is used to report the frequency reuse information of each BSS surrounding the station to the access point. The frequency reuse information and the foregoing reuse policy are already described in the foregoing embodiment in FIG. 2, and details are not described herein again. A specific parameter of the frequency reuse manner that is of the access point and that is adjusted by the adjustment unit 302 is determined according to the reuse policy, a change of the frequency reuse information of each BSS surrounding the access point, and a change of the frequency reuse information of each BSS surrounding the station. For details, refer to the following solutions:

If an orthogonal frequency allocation solution is used for the overlapping area, a frequency band that does not overlap that of an adjacent BSS is used for data transmitted by a station in an overlapping area between the BSS and the adjacent BSS; or if a solution of coordination between at least two BSSs is used for the overlapping area, an operating frequency band the same as that of an adjacent BSS is allocated for an overlapping area between the BSS and the adjacent BSS.

The foregoing overlapping area refers to an overlapping area between a real BSS (and a virtual BSS of the real BSS) and another real BSS (and a virtual BSS of the another real BSS).

Based on either of the foregoing two solutions, the following content is further included:

A frequency band used in a center region is determined by each access point; and there is at least one primary channel on an operating frequency band of each virtual BSS.

With reference to the foregoing content, the frequency reuse manner of the access point may be effectively adjusted, and therefore a quantity of virtual BSSs and operating frequency bands of the virtual BSSs are adjusted.

In this embodiment of the present invention, an adjustment unit 302 adjusts a frequency reuse manner of the access point according to a third message received by a second receiving unit 301, frequency reuse information of each basic service set surrounding the access point, and the foregoing reuse policy, and therefore a fractional frequency reuse state of the access point is slightly adjusted, so as to provide a flexible and compatible fractional frequency reuse mode.

In the embodiments shown in FIG. 1 to FIG. 3, a specific structure of the access point device is described from a perspective of a function unit. The following describes the specific structure of the access point device from a perspective of hardware with reference to an embodiment shown in FIG. 4.

Figure 4:
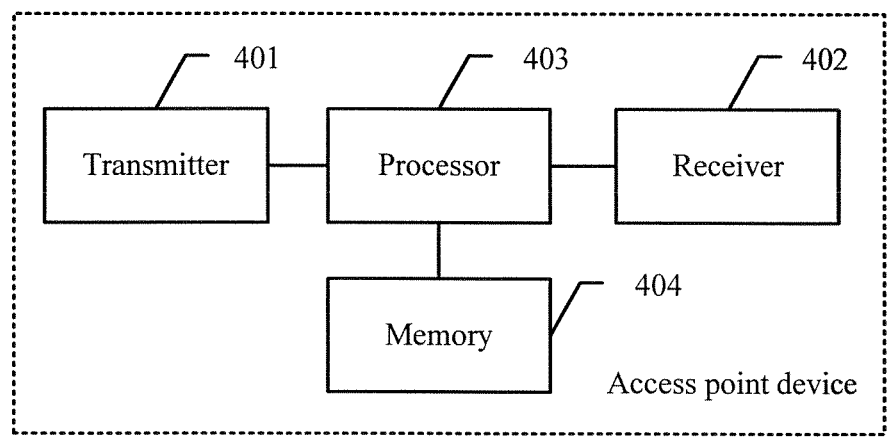
FIG. 4 is a schematic structural diagram of another embodiment of an access point device according to an embodiment of the present invention.

As shown in FIG. 4, the access point device includes a transmitter 401, a receiver 402, a processor 403, and a memory 404.

The access point device involved in this embodiment of the present invention may have more or fewer components than those shown in FIG. 4, may combine two or more components, or may have different component configurations or settings. Various components may be implemented by hardware including one or more signal processing and/or application-specific integrated circuits, by software, or by a combination of hardware and software.

The foregoing transmitter 401 is configured to perform the following operation:

sending a first message to a station, where the first message carries indication information indicating that a basic service set is in a fractional frequency reuse mode.

The foregoing receiver 402 is configured to perform the following operation:

receiving a second message sent by the station, where the second message carries indication information indicating that the station supports the fractional frequency reuse mode.

The foregoing processor 403 is configured to perform the following operation:

communicating with the station in the fractional frequency reuse mode after determining, according to the received second message, that the station supports the fractional frequency reuse mode.

The first message sent by the foregoing transmitter 401 includes a field, where the field is used to indicate that the foregoing basic service set is in the fractional frequency reuse mode.

The foregoing transmitter 401 is further configured to perform the following operation:

sending, to the station, a parameter of a frequency reuse manner that is of an access point and that is adjusted.

The foregoing receiver 402 is further configured to perform the following operations:

scanning a channel, so as to obtain frequency reuse information of each basic service set surrounding the access point; and receiving a third message sent by the foregoing station, where the third message carries frequency reuse information of each basic service set surrounding the station.

The foregoing processor 403 is further configured to perform the following operations:

determining a frequency reuse manner of the access point according to a reuse policy and the obtained frequency reuse information of each basic service set surrounding the access point, where the reuse policy is a frequency allocation manner used by the access point to maximize a throughput of a basic service set or to maximize a quantity of supported users in an overlapping area of a basic service set; and adjusting the frequency reuse manner of the access point according to the reuse policy, the frequency reuse information of each basic service set surrounding the access point, and the foregoing third message.

In this embodiment, a processor 403 can effectively initialize a frequency reuse manner of an access point, and adjusts the frequency reuse manner of the access point according to a change of frequency reuse information of each surrounding BSS, so that the access point communicates with the station in a flexible and compatible fractional frequency reuse mode, which effectively reduces frequency interference in a Wi-Fi network.

Figure 5:
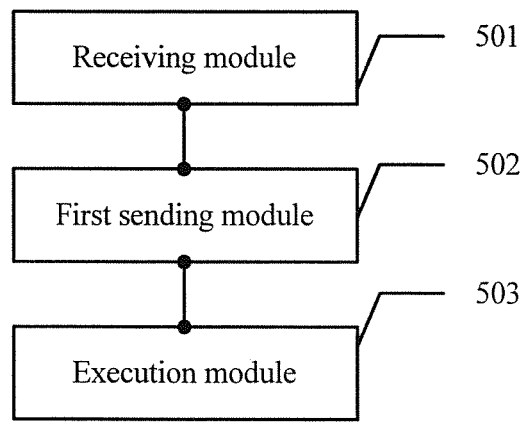
FIG. 5 is a schematic structural diagram of an embodiment of a station device according to an embodiment of the present invention.

In the foregoing embodiments, that an access point communicates with a station in a fractional frequency reuse mode is described from a perspective of an access point side. The following gives a description from a station side. Referring to FIG. 5, an embodiment of a station device according to an embodiment of the present invention includes:

a receiving module 501, configured to receive a first message sent by an access point, where the first message carries indication information indicating that a basic service set is in a fractional frequency reuse mode;

a first sending module 502, configured to send a second message to the access point, where the second message carries indication information indicating that a station supports the fractional frequency reuse mode; and an execution module 503, configured to communicate with the access point in the fractional frequency reuse mode after the foregoing access point determines, according to the second message sent by the foregoing first sending module 502, that the station supports the fractional frequency reuse mode.

It should be noted that the foregoing BSS includes at least two virtual BSSs; each virtual ESS is corresponding to a virtual BSSID, and the virtual BSS is corresponding to an operating frequency band of the access point; the virtual BSSID is associated with a real BSSID, and the real BSSID is a MAC address of the access point.

The foregoing first message includes a field, where the field is used to indicate that the BSS is in the fractional frequency reuse mode, and the fractional frequency reuse mode is implemented by using the at least two virtual BSSs and operating frequency bands corresponding to the virtual BSSs. The first message may be a Beacon frame of one information bit or another management frame.

That the station supports the fractional frequency reuse mode indicates that the station can identify that the BSS is in the fractional frequency reuse mode, and obtain frequency band information corresponding to the BSS.

Communicating with the access point in the fractional frequency reuse mode indicates that the access point may choose to simultaneously send data for the station on operating frequency bands of the at least two virtual BSSs, or freely switch an operating frequency band of the station within the operating frequency band of the access point by using a management frame.

In this embodiment of the present invention, a receiving module 501 receives a first message sent by an access point, where the first message carries indication information indicating that a basic service set is in a fractional frequency reuse mode; a first sending module 502 sends a second message to the access point, where the second message carries indication information indicating that a station supports the fractional frequency reuse mode; and after the access point determines, according to the second message sent by the first sending module 502, that the station supports the fractional frequency reuse mode, an execution module 503 performs a step of communicating with the access point in the fractional frequency reuse mode, so that the station operates in the fractional frequency reuse mode, which effectively reduces frequency interference in a Wi-Fi network.

Figure 6:
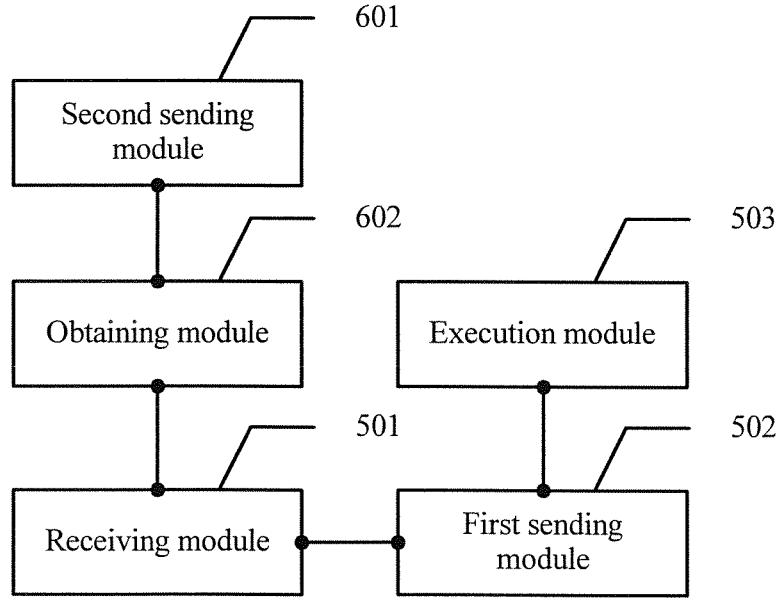
FIG. 6 is a schematic structural diagram of another embodiment of a station device according to an embodiment of the present invention.

In the foregoing embodiment, the station device may send related information to the access point, so that the access point adjusts a frequency reuse manner of the access point. Optionally, as shown in FIG. 6, the foregoing station device further includes:

a second sending module 601, configured to send a third message to the access point, where the third message carries frequency reuse information of each basic service set surrounding the station; and an obtaining module 602, configured to obtain a parameter of a frequency reuse manner that is of the access point and that is adjusted by the foregoing access point, where the parameter of the frequency reuse manner of the access point is adjusted by the access point according to scanned frequency reuse information of each basic service set surrounding the access point, a reuse policy, and the foregoing third message, and the reuse policy is a frequency allocation manner used by the access point to maximize a throughput of a basic service set or to maximize a quantity of supported users in an overlapping area of a basic service set.

It should be noted that the foregoing third message is an extended neighbor report periodically sent by the station to the access point, and is used to report the frequency reuse information of each BSS surrounding the station to the access point. The frequency reuse information includes operating frequency bands of at least two virtual BSSs and a correspondence between a virtual BSSID and a real BSSID. A specific parameter of the foregoing frequency reuse manner that is of the access point and that is adjusted is determined according to the reuse policy, a change of the frequency reuse information of each BSS surrounding the access point, and a change of the frequency reuse information of each BSS surrounding the station.

The foregoing reuse policy refers to a frequency allocation method used by the access point to maximize a throughput of a BSS of the access point or to maximize a quantity of supported users in a current OBSS environment. Therefore, different reuse policies have different reuse methods. Common methods include but are not limited to the following rules:

If an orthogonal frequency allocation solution is used for the overlapping area, a frequency band that does not overlap that of an adjacent BSS is used for data transmitted by a station in an overlapping area between the BSS and the adjacent BSS; or if a solution of coordination between at least two BSSs is used for the overlapping area, an operating frequency band the same as that of an adjacent BSS is allocated for an overlapping area between the BSS and the adjacent BSS.

The foregoing overlapping area refers to an overlapping area between a real BSS (and a virtual BSS of the real BSS) and another real BSS (and a virtual BSS of the another real BSS).

Based on either of the foregoing two common methods, the reuse policy further includes the following content:

A frequency band used in a center region is determined by each access point; and there is at least one primary channel on an operating frequency band of each virtual BSS.

In this embodiment of the present invention, a second sending module 601 sends a third message to an access point, so that the access point adjusts a frequency reuse manner of the access point according to scanned frequency reuse information of each basic service set surrounding the access point, a reuse policy, and frequency reuse information that is of each BSS surrounding a station and that is carried in the third message, so as to provide a flexible and compatible fractional frequency reuse mode.

In the embodiments shown in FIG. 5 and FIG. 6, a specific structure of the station device is described from a perspective of a function module. The following describes the specific structure of the station device from a perspective of hardware with reference to an embodiment shown in FIG. 7.

Figure 7:
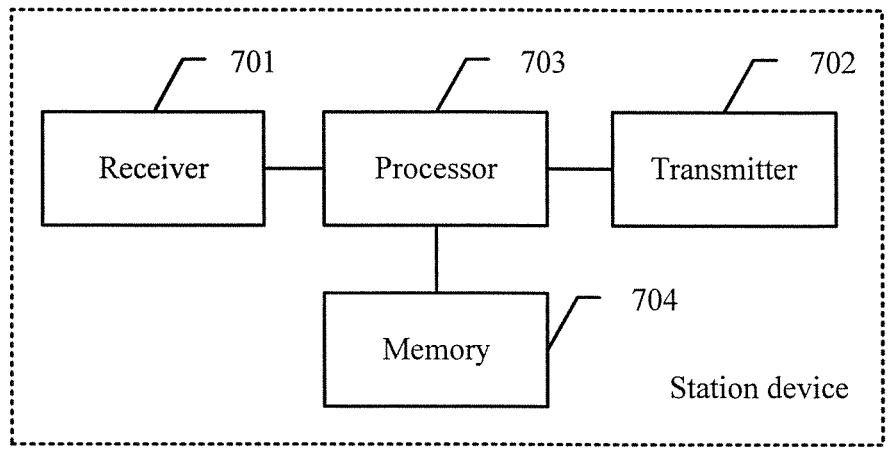
FIG. 7 is a schematic structural diagram of another embodiment of a station device according to an embodiment of the present invention.

As shown in FIG. 7, the station device includes a receiver 701, a transmitter 702, a processor 703, and a memory 704.

The station device involved in this embodiment of the present invention may have more or fewer components than those shown in FIG. 7, may combine two or more components, or may have different component configurations or settings. Various components may be implemented by hardware including one or more signal processing and/or application-specific integrated circuits, by software, or by a combination of hardware and software.

The foregoing receiver 701 is configured to perform the following operation:

receiving a first message sent by an access point, where the first message carries indication information indicating that a basic service set is in a fractional frequency reuse mode.

The foregoing transmitter 702 is configured to perform the following operation:

sending a second message to the access point, where the second message carries indication information indicating that a station supports the fractional frequency reuse mode.

The foregoing processor 703 is configured to perform the following operation:

communicating with the access point in the fractional frequency reuse mode after the foregoing access point determines, according to the second message, that the station supports the fractional frequency reuse mode.

The foregoing transmitter 702 is further configured to perform the following operation:

sending a third message to the foregoing access point, where the third message carries frequency reuse information of each basic service set surrounding the station.

The foregoing receiver 701 is further configured to perform the following operation:

obtaining a parameter of a frequency reuse manner that is of the access point and that is adjusted by the foregoing access point, where the parameter of the frequency reuse manner of the access point is adjusted by the access point according to scanned frequency reuse information of each basic service set surrounding the access point, a reuse policy, and the foregoing third message, and the reuse policy is a frequency allocation manner used by the access point to maximize a throughput of a basic service set or to maximize a quantity of supported users in an overlapping area of a basic service set.

In this embodiment, after an access point determines, according to a second message, that a station supports a fractional frequency reuse mode, a processor 703 operates in the flexible and compatible fractional frequency reuse mode with the access point, which effectively reduces frequency interference in a Wi-Fi network.

To facilitate better implementation of the foregoing related apparatus according to the embodiments of the present invention, the following further provides a related method used to cooperate with the foregoing apparatus.

Figure 8:
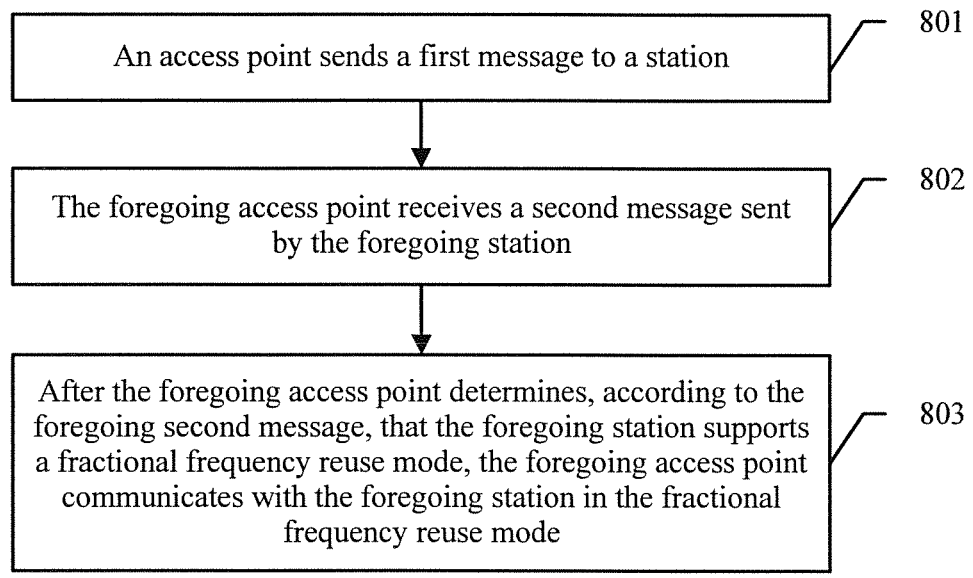
FIG. 8 is a schematic flowchart of an embodiment of a frequency reuse method according to an embodiment of the present invention.

Referring to FIG. 8, an embodiment of a frequency reuse method according to an embodiment of the present invention includes:

801. An access point sends a first message to a station.

The access point sends the first message to the station, where the first message carries indication information indicating that a BSS is in a fractional frequency reuse mode.

802. The foregoing access point receives a second message sent by the foregoing station.

After the station receives the first message sent by the access point, the station sends the second message to the access point, where the second message carries indication information indicating that the station supports the fractional frequency reuse mode. That the station supports the fractional frequency reuse mode indicates that the station can identify that the BSS is in the fractional frequency reuse mode, and obtain frequency band information corresponding to the BSS.

803. After the foregoing access point determines, according to the foregoing second message, that the foregoing station supports a fractional frequency reuse mode, the access point communicates with the station in the fractional frequency reuse mode.

After the access point determines, according to the indication information that indicates that the station supports the fractional frequency reuse mode and that is carried in the second message, that the station supports the fractional frequency reuse mode, the access point communicates with the station in the fractional frequency reuse mode. That the access point communicates with the station in the fractional frequency reuse mode indicates that the access point may choose to simultaneously send data for the station on operating frequency bands of at least two virtual BSSs, or freely switch an operating frequency band of the station within an operating frequency band of the access point by using a management frame.

In this embodiment of the present invention, after an access point determines, according to a second message, that a station supports a fractional frequency reuse mode, the access point communicates with the station in the fractional frequency reuse mode, so that the station operates in the fractional frequency reuse mode, which effectively reduces frequency interference in a Wi-Fi network.

Figure 9:
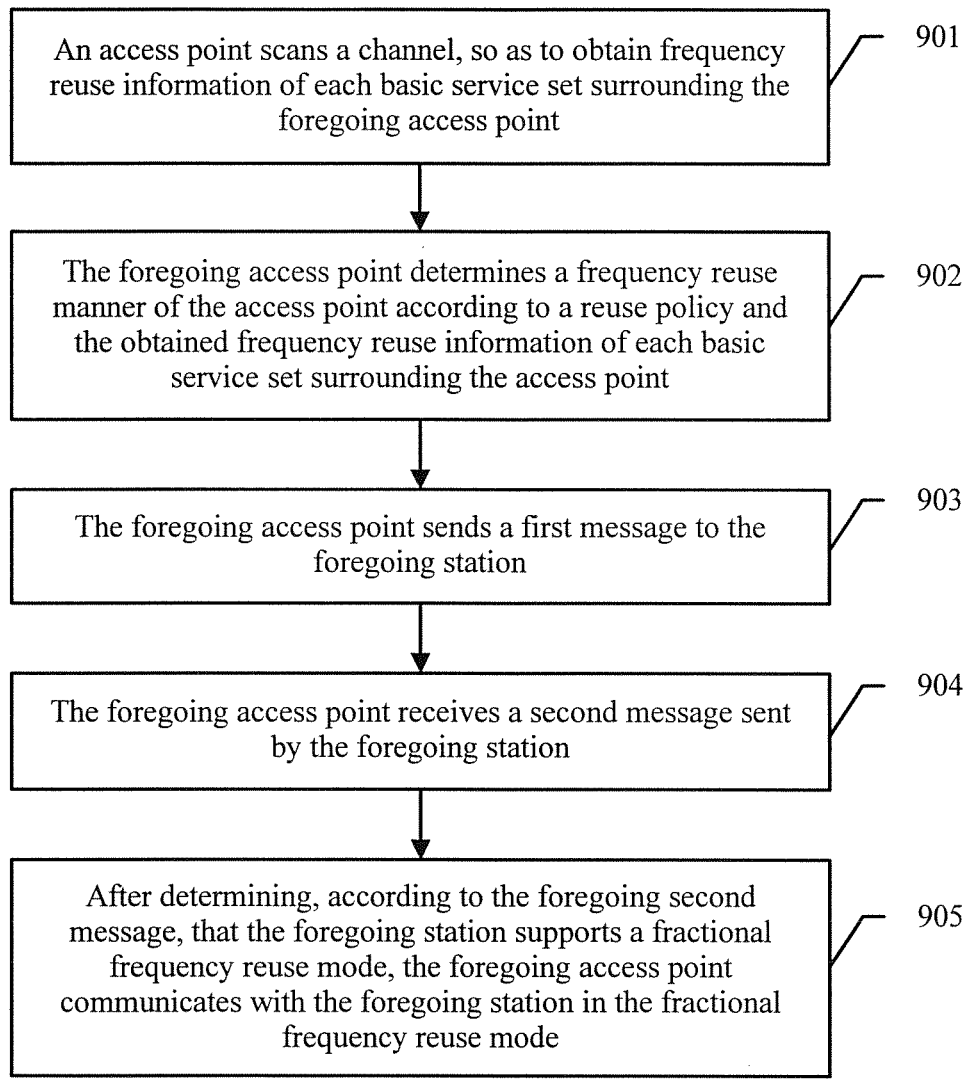
FIG. 9 is a schematic flowchart of another embodiment of a frequency reuse method according to an embodiment of the present invention.

In the frequency reuse method in the foregoing embodiment, a frequency reuse manner of the access point may be further initialized according to a reuse policy and frequency reuse information of each basic service set surrounding the access point. Referring to FIG. 9, another embodiment of a frequency reuse method according to an embodiment of the present invention includes:

901. An access point scans a channel, so as to obtain frequency reuse information of each basic service set surrounding the access point.

The access point scans the operating channel, so as to obtain the frequency reuse information of each basic service set BSS surrounding the access point. It may be understood that the access point may obtain the frequency reuse information of each surrounding BSS in many manners. For example, the frequency reuse information may be obtained by detecting a signal sent by an access point or a station of each surrounding BSS, where the signal carries a related information field. A specific manner of obtaining or indicating the frequency reuse information is not limited herein.

It should be noted that the frequency reuse information of each surrounding BSS may be specifically learned from a frequency reuse correspondence of each surrounding BSS. For example, the frequency reuse correspondence is as follows: $BSS_m$: [($BSS_{m0}$, $CH_{m0}$), ($BSS_{m1}$, $CH_{m1}$), . . . , ($BSS_{mk}$, $CH_{mk}$)]. That K=2 is used as an example, and allocation may be as follows: $CH_{m0}$ is a frequency band of a center region, $CH_{m1}$ is a frequency band of an edge region, and $CH_{m2}$ is a frequency band of an overlapping area. For the frequency reuse correspondence, a management frame or data frame sent by a station or an access point of the $BSS_m$ may carry only a virtual BSSID but no real BSSID (that is, the foregoing $BSS_m$), and the station only needs to learn each virtual BSS and an operating frequency band corresponding to the virtual BSS. The foregoing management frame or data frame includes an information indication bit, where the information bit carries the frequency reuse correspondence of the BSS.

Further, the management frame or data frame sent by the station or the access point of the $BSS_m$ may identify that the virtual BSSID indicates a virtual BSS or a real BSS. If the virtual BSSID indicates a virtual BSS, it may be further identified that the current BSSID indicates a center BSS, an edge BSS, or a BSS in an overlapping area.

902. The foregoing access point determines a frequency reuse manner of the access point according to a reuse policy and the obtained frequency reuse information of each basic service set surrounding the foregoing access point.

The access point determines the frequency reuse manner of the access point according to the reuse policy and the frequency reuse information that is of each basic service set surrounding the access point and that is obtained in step 901.

Figure 10:
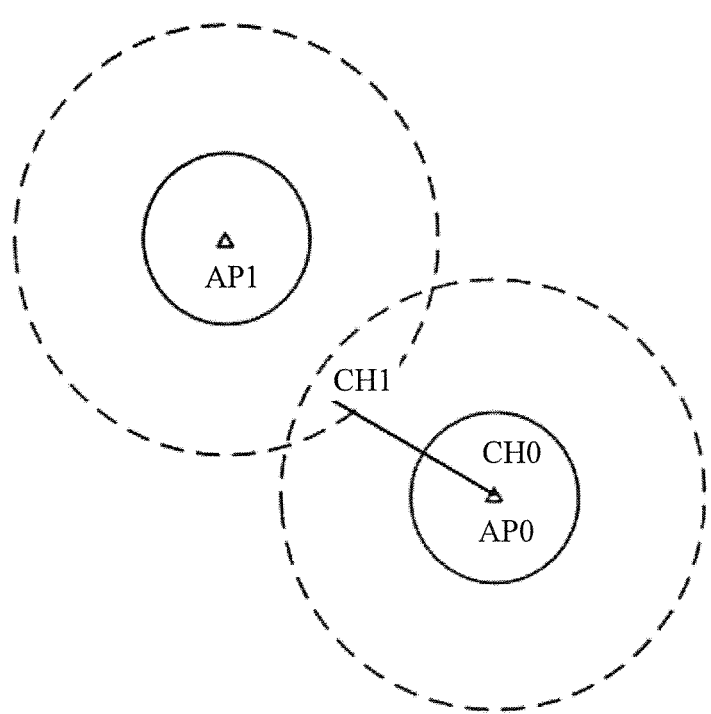
FIG. 10 is a schematic diagram of distributing operating frequency bands for two adjacent access points according to an embodiment of the present invention.

The access point may be set to an access point that has two or more virtual BSSs and that supports a fractional frequency reuse mode, where each virtual BSS is corresponding to a virtual BSSID. The virtual BSS is corresponding to a frequency band of fractional frequency reuse on which the access point operates. For example, as shown in FIG. 10, an access point AP0 and an access point AP1 support fractional frequency reuse. The access point AP0 may operate on two frequency bands $CH_0$ and $CH_1$. $CH_0$ is a frequency band of a center region of the virtual BSS, a start frequency is $f_{00}$, and an end frequency is $f_{01}$. $CH_1$ is a frequency band of an edge region of the virtual BSS, a start frequency is $f_{10}$, and an end frequency is $f_{11}$. This embodiment of the present invention is not limited to two frequency bands. There may be k frequency bands (k=0, 1, 2, 3, ..., k), and a quantity of frequency bands is not limited. It should be noted that the foregoing reuse policy refers to a frequency allocation method used by the access point to maximize a throughput of a BSS of the access point or to maximize a quantity of supported users in a current OBSS environment. Therefore, different reuse policies have different reuse methods. Common methods include but are not limited to the following rules:

If an orthogonal frequency allocation solution is used for an overlapping area, a frequency band that does not overlap that of an adjacent BSS is used for data transmitted by a station in an overlapping area between the BSS and the adjacent BSS; or if a solution of coordination between at least two BSSs is used for an overlapping area, an operating frequency band the same as that of an adjacent BSS is allocated for an overlapping area between the BSS and the adjacent BSS.

The foregoing overlapping area refers to an overlapping area between a real BSS (and a virtual BSS of the real BSS) and another real BSS (and a virtual BSS of the another real BSS).

Based on either of the foregoing two common methods, the reuse policy further includes the following content:

A frequency band used in a center region is determined by each access point; and there is at least one primary channel on an operating frequency band of each virtual BSS.

With reference to the foregoing frequency reuse information and specific content of the reuse policy, an access point in the OBSS environment can effectively initialize a frequency reuse manner of the access point, and therefore a quantity of virtual BSSs and an operating frequency band of each virtual BSS can be determined.

903. The foregoing access point sends a first message to the foregoing station.

It should be noted that the first message includes a field, where the field is used to indicate that the BSS is in a fractional frequency reuse mode, and the fractional frequency reuse mode is implemented by using at least two virtual BSSs and operating frequency bands corresponding to the virtual BSSs. For an indication method, the access point may add a field to a Beacon or another management frame in an information bit manner, so as to indicate a quantity of virtual BSSs or directly represent a correspondence between at least two virtual BSSIDs and a real BSSID.

Further, the access point not only indicates the quantity of the foregoing virtual BSSs, but also may indicate an address of the virtual BSS by using a bit in the field. A method for indicating that the BSS is in the fractional frequency reuse mode is not limited herein.

The foregoing Beacon or the another management frame may be sent on any one or at least two of operating frequency bands corresponding to the at least two virtual BSSs. The access point needs to further indicate the operating frequency bands of the virtual BSSs in the Beacon or the another management frame.

Further, the at least two virtual BSSIDs are associated with the real BSSID. The real BSSID is a MAC address of the access point, and the virtual BSSIDs are in one-to-one correspondence with their own virtual BSSs. This correspondence may be represented by using the following expression:

BSSm (BSSm0, ..., BSSmk), where the BSSm is the real BSSID of the access point. (BSSm0, ..., BSSmk) are k+1 virtual BSSIDs corresponding to the BSSm.

The foregoing correspondence may be specifically indicated in a frame format manner. In actual indication, the real BSSID may not need to be indicated, and only virtual BSSIDs corresponding to operating frequency bands are indicated, for example, $(BSS_{m0}, \ldots, BSS_{mk})$. If the real BSSID is also corresponding to an operating frequency band, an indication manner may be: $(BSS_{m0}, \ldots, BSS_m, \ldots, BSS_{mk})$. In addition to the foregoing indication method, the correspondence may be further implemented by using a mapping relationship between the real BSSID and the virtual BSSID. For example, two bits of an MSB (Most Significant Bit, most significant bit) are set to 00, which indicates that the BSSID is the virtual BSSID; or the two bits are set to 11, which indicates that the BSSID is the real BSSID. A method for indicating the foregoing correspondence and a method for indicating the mapping relationship are not limited herein.

904. The foregoing access point receives a second message sent by the foregoing station.

The station sends the second message to the access point, where the second message carries indication information indicating that the station supports the fractional frequency reuse mode. That the station supports the fractional frequency reuse mode indicates that the station can identify that the BSS is in the fractional frequency reuse mode, and obtain frequency band infatuation corresponding to the BSS. The second message may be an association request frame or another frame sent by the station. The frame carries an indication information bit of a capability field, and is used to indicate whether the station supports the fractional frequency reuse mode. In addition, supporting the fractional frequency reuse mode means that the station can learn a relationship between the virtual BSSID and the real BSSID.

905. After determining, according to the foregoing second message, that the foregoing station supports a fractional frequency reuse mode, the foregoing access point communicates with the station in the fractional frequency reuse mode.

After determining, according to the indication information bit carried in the second message, that the station supports the fractional frequency reuse mode, the access point may choose to simultaneously send data for the station on the operating frequency bands of the at least two virtual BSSs, or may freely switch an operating frequency band of the station within the operating frequency band of the access point by using a management frame. Likewise, the station may also freely switch within the operating frequency band of the access point according to the foregoing at least two virtual BSSs, the operating frequency bands respectively corresponding to the at least two virtual BSSs, and a relationship between the virtual BSSs (for example, whether the virtual BSSs are corresponding to a same real BSS), provided that permission is granted by the access point.

In this embodiment of the present invention, an access point initializes a frequency reuse manner of the access point according to a reuse policy and obtained frequency reuse information of each BSS surrounding the access point, and therefore a quantity of virtual BSSs and operating frequency bands of the virtual BSSs are determined, so as to provide a flexible and compatible fractional frequency reuse mode.

In the frequency reuse method in the foregoing embodiment, the frequency reuse manner of the access point may be further adjusted. Details are as follows:

After step 902, the access point receives a third message sent by the station, where the third message carries frequency reuse information of each basic service set surrounding the station; the access point adjusts the frequency reuse manner of the access point according to the foregoing reuse policy, the frequency reuse information of each basic service set surrounding the access point, and the third message, and sends, to the station, a parameter of a frequency reuse manner that is of the access point and that is adjusted.

It should be noted that the foregoing third message is an extended neighbor report periodically sent by the station to the access point, and is used to report the frequency reuse information of each BSS surrounding the station to the access point. Based on an existing neighbor report, the extended neighbor report sent by the station may further supplement information about a BSSID in the report, for example, whether a BSS is a real BSS, and a corresponding region is a BSS edge region, or a BSS center region. An indication structure shown in FIG. 11 is an example of extended indication.

Figure 11:
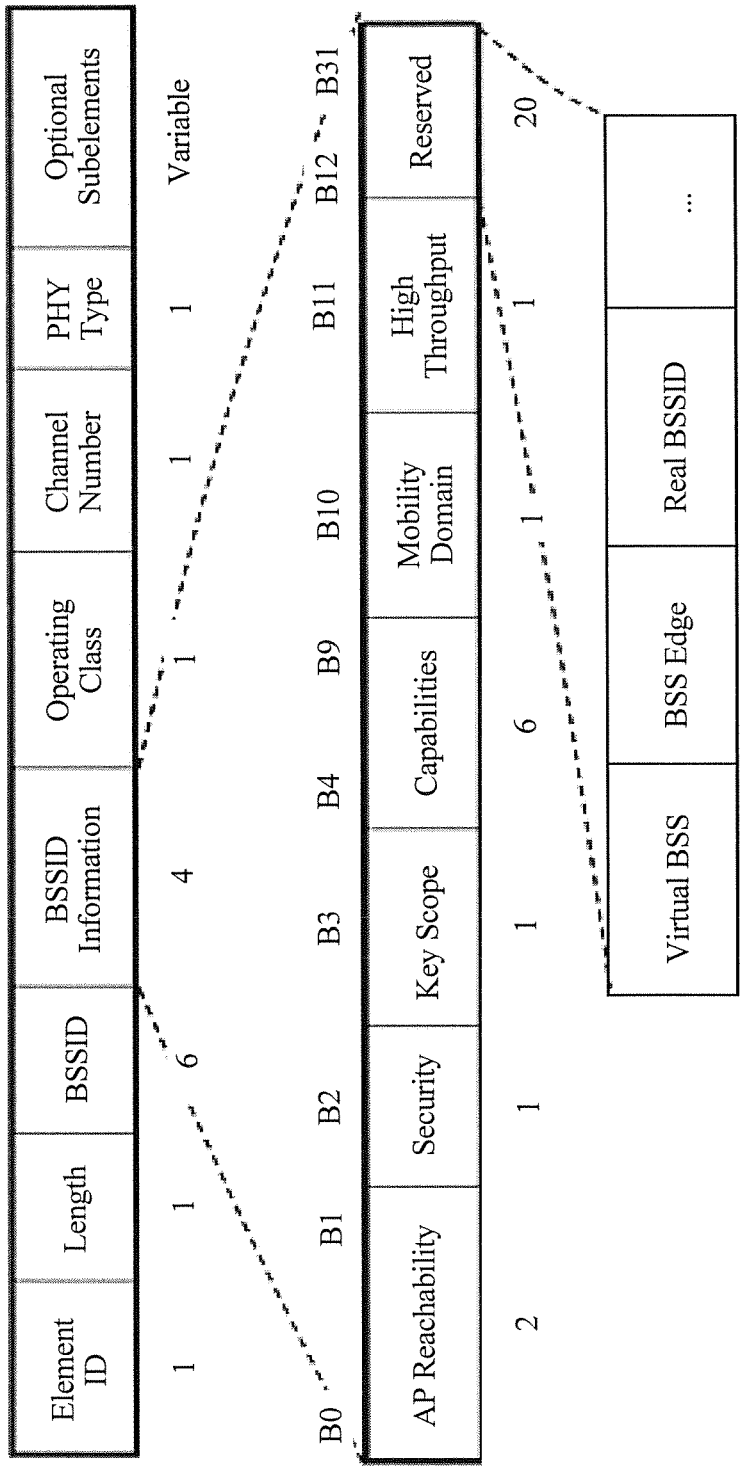
FIG. 11 is a schematic structural diagram of extended indication of an extended neighbor report according to an embodiment of the present invention.

For the indication structure that is shown in FIG. 11 and that is of an extended neighbor report supporting more information about a BSS, Element in the figure indicates a unit identifier; Length indicates a length, BSSID indicates a basic service set identifier; BSSID Information indicates basic service set information bits; Operating Class indicates an operating class; Channel Number indicates a channel number; PHY Type indicates a physical layer type; Optional Subelements indicate optional subelements; Variable indicates a variable part; AP Reachability indicates network access point detection; Security indicates a network security technology and a network security protocol; Key Scope indicates a key scope; Capabilities indicate processing capabilities; Mobility Domain indicates a mobile domain; High Throughput indicates a high throughput; Reserved indicates reservation; Virtual BSS indicates a virtual basic service set; BSS Edge indicates a basic service set edge region; Real BSS indicates a real basic service set.

In this embodiment of the present invention, an access point adjusts a frequency reuse manner of the access point according to a received third message, frequency reuse information of each basic service set surrounding the access point, and the foregoing reuse policy, and therefore a fractional frequency reuse state of the access point is slightly adjusted, so as to provide a flexible and compatible fractional frequency reuse mode.

Based on the frequency reuse method in the foregoing embodiment, optionally, in the frequency reuse method provided in this embodiment of the present invention, the virtual BSS may not be introduced, but the station is directly notified, in the Beacon or the another management frame, that the current BSS operates on at least two frequency bands. In this case, a correspondence between the BSS and the at least two operating frequency bands is represented as: $BSS_m$: $(CH_{m0}, CH_{m1}, \ldots, CH_{mk})$.

Accordingly, to better support this operating manner, the access point needs to have a primary channel on each operating frequency band, so that the station operating on the frequency band can learn information about the BSS without switching a frequency band. In this case, the station selects any one of operating frequency bands decoded by the station or all operating frequency bands supported by the current access point as a communication frequency band of the station.

When the access point obtains the correspondence between the BSS and the at least two operating frequency bands of the BSS by scanning a channel and determines an operating channel (that is, the frequency reuse manner) of the BSS, the virtual BSS may not need to be set. In this case, a BSSID of the BSS operating in fractional frequency reuse and the at least two operating frequency bands corresponding to the BSS need to be indicated in the extended neighbor report reported by the station. A specific implementation manner is similar to the description in the foregoing embodiment in FIG. 9, and details are not described herein again.

Optionally, this embodiment of the present invention may be further physically implemented by directly using at least two BSSs, and these BSSs are unified as one virtual BSS, for example, a current Dual-band (dual-band) implementation method in which 2.4 GHz and 5 GHz coexist is used. Accordingly, another implementation manner may be obtained by simply reversing the relationship between the real BSS and the virtual BSSs in the embodiment in FIG. 9. A specific step is similar to the description in the foregoing embodiment in FIG. 9, and details are not described herein again.

For ease of understanding, the following uses a specific application scenario to describe in detail the frequency reuse method according to this embodiment of the present invention.

The foregoing frequency reuse method may support both an existing WLAN (wireless local area network) terminal Legacy STA (legacy station) and a new generation WLAN terminal NG STA (Next Generation Station, next generation station).

For the NG STA, an access point automatically scans an operating channel of each BSS surrounding the access point or receives an operating signal sent by the NG STA, so as to obtain operating frequency band information of each BSS.

The access point determines a frequency reuse manner of the access point according to a reuse policy and the obtained operating frequency band information of each surrounding BSS. The access point determines, according to the frequency reuse manner of the access point, a quantity of virtual BSSs supported by the access point and operating frequency bands corresponding to the virtual BSSs. The access point may further adjust the frequency reuse manner of the access point according to the reuse policy, a change of frequency reuse information of each ESS surrounding the access point, and a change of frequency reuse information of each BSS surrounding the station.

The access point carries related information indicating that a BSS is in a fractional frequency reuse mode in a Beacon or another management frame, and sends the related information to the surrounding NG STA. The related information includes operating frequency bands of at least two virtual BSSs and a correspondence between a virtual BSSID and a real BSSID. After the NG STA receives the Beacon sent by the access point, the NG STA sends a frame indicating whether the NG STA supports the fractional frequency reuse mode to the access point. If the NG STA supports the fractional frequency reuse mode, the NG STA can learn a relationship between the virtual BSSID and the real BSSID.

After the access point determines that the NG STA supports the fractional frequency reuse mode, the access point may choose to simultaneously send data for the station on the operating frequency bands of the at least two virtual BSSs, or may switch an operating frequency band of the station within an operating frequency band of the access point by using a management frame. Likewise, the NG STA may also freely switch within the operating frequency band of the access point according to the at least two virtual BSSs, the operating frequency bands respectively corresponding to the at least two virtual BSSs, and a relationship between the virtual BSSs (for example, whether the virtual BSSs are corresponding to a same real BSS), provided that permission is granted by the access point. For example, as shown in FIG. 10, an access point AP0 and an access point AP1 support fractional frequency reuse. The access point AP0 may operate on two frequency bands $CH_0$ and $CH_1$. $CH_0$ is a frequency band of a center region of the virtual BSS, a start frequency is $f_{00}$, and an end frequency is $f_{01}$. $CH_1$ is a frequency band of an edge region of the virtual BSS, a start frequency is $f_{10}$, and an end frequency is $f_{11}$. The access point may switch an original operating frequency band of the NG STA from $CH_1$ to $CH_0$ or from $CH_0$ to $CH_1$ by sending a management frame without re-associating the NG STA with the access point. This embodiment of the present invention is not limited to two frequency bands. There may be k frequency bands (k=1, 2, 3, . . . , k), and a quantity of frequency bands is not limited.

The Legacy STA may also be supported. A communication process is similar to content used to describe the foregoing NG STA, and details are not described herein again.

Figure 12:
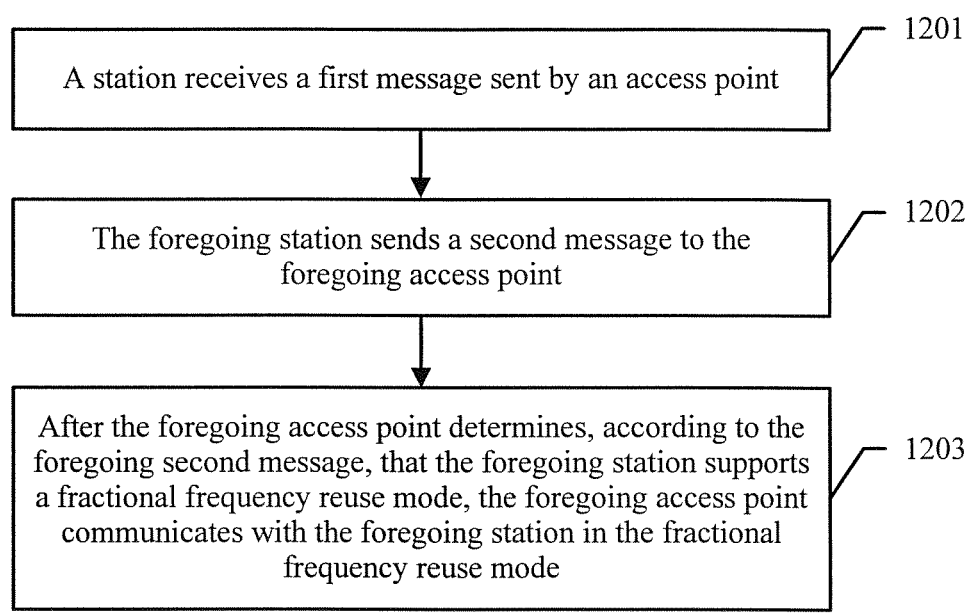
FIG. 12 is a schematic flowchart of another embodiment of a frequency reuse method according to an embodiment of the present invention.

In the foregoing embodiments, that an access point communicates with a station in a fractional frequency reuse mode is described from a perspective of an access point side. The following gives a description from a station side. Referring to FIG. 12, another embodiment of a frequency reuse method according to an embodiment of the present invention includes:

1201. A station receives a first message sent by an access point.

The station receives the first message sent by the access point, where the first message carries indication information indicating that a basic service set BSS is in a fractional frequency reuse mode.

The foregoing first message includes a field, where the field is used to indicate that the BSS is in the fractional frequency reuse mode, and the fractional frequency reuse mode is implemented by using at least two virtual BSSs and operating frequency bands corresponding to the virtual BSSs. For an indication method, the access point may add a field to a Beacon or another management frame in an information bit manner, so as to indicate a quantity of virtual BSSs or directly represent a correspondence between at least two virtual BSSIDs and a real BSSID. Further, the access point not only indicates the quantity of the foregoing virtual BSSs, but also may indicate an address of the virtual BSS by using a bit in the field. A method for indicating that the BSS is in the fractional frequency reuse mode is not limited herein.

The foregoing Beacon or the another management frame may be sent on any one or at least two of operating frequency bands corresponding to the at least two virtual BSSs. The access point needs to further indicate the operating frequency bands of the virtual BSSs in the Beacon or the another management frame.

Further, the at least two virtual BSSIDs are associated with the real BSSID. The real BSSID is a MAC address of the access point, and the virtual BSSIDs are in one-to-one correspondence with their own virtual BSSs. This correspondence may be represented by using the following expression:

BSSm (BSSm0, . . . , BSSmk), where the BSSm is the real BSSID of the access point, and (BSSm0, . . . , BSSmk) are k+1 virtual BSSIDs corresponding to the BSSm.

The foregoing correspondence may be specifically indicated in a frame format manner. In actual indication, the real BSSID may not need to be indicated, and only virtual BSSIDs corresponding to operating frequency bands are indicated, for example, ($BSS_{m0}$, . . . , $BSS_{mk}$). If the real BSSID is also corresponding to an operating frequency band, an indication manner may be: ($BSS_{m0}$, . . . , $BSS_m$, . . . , $BSS_{mk}$). In addition to the foregoing indication method, the correspondence may be further implemented by using a mapping relationship between the real BSSID and the virtual BSSID. For example, two bits of an MSB are set to 00, which indicates that the BSSID is a virtual BSSID; or the two bits are set to 11, which indicates that the BSSID is a real BSSID. A method for indicating the foregoing correspondence and a method for indicating the mapping relationship are not limited herein.

1202. The foregoing station sends a second message to the foregoing access point.

The station sends the second message to the access point, where the second message carries indication information indicating that the station supports the fractional frequency reuse mode.

It should be noted that that the station supports the fractional frequency reuse mode indicates that the station can identify that the BSS is in the fractional frequency reuse mode, and obtain frequency band information corresponding to the BSS. The foregoing second message may be an association request frame or another frame sent by the station. The frame carries an indication information bit of a capability field, and is used to indicate whether the station supports the fractional frequency reuse mode. In addition, supporting the fractional frequency reuse mode means that the station can learn a relationship between the virtual BSSID and the real BSSID.

1203. After the foregoing access point determines, according to the foregoing second message, that the foregoing station supports a fractional frequency reuse mode, the station communicates with the access point in the fractional frequency reuse mode.

After the access point determines, according to the indication information that indicates that the station supports the fractional frequency reuse mode and that is carried in the second message, that the station supports the fractional frequency reuse mode, the access point communicates with the station in the fractional frequency reuse mode. That the station communicates with the access point in the fractional frequency reuse mode indicates that the access point may choose to simultaneously send data for the station on the operating frequency bands of the at least two virtual BSSs, or freely switch an operating frequency band of the station within an operating frequency band of the access point by using a management frame.

The station may freely switch within the operating frequency band of the access point according to the foregoing at least two virtual BSSs, the operating frequency bands respectively corresponding to the at least two virtual BSSs, and a relationship between the virtual BSSs (for example, whether the virtual BSSs are corresponding to a same real ESS), provided that permission is granted by the access point. Likewise, the access point may also choose to simultaneously send the data for the station on the operating frequency bands of the at least two virtual BSSs, or freely switch the operating frequency band of the station within the operating frequency band of the access point by using the management frame.

In this embodiment of the present invention, after the station receives a first message sent by the access point, the station sends a second message to the access point, and after the access point determines, according to the second message, that the station supports a fractional frequency reuse mode, the station communicates with the access point in the fractional frequency reuse mode, so that the station operates in the fractional frequency reuse mode, which effectively reduces frequency interference in a Wi-Fi network.

In the frequency reuse method in the foregoing embodiment, the station may further obtain a frequency reuse manner that is of the access point and that is adjusted by the access point, so as to flexibly switch the frequency band. Details are as follows:

The station sends a third message to the access point, where the third message carries frequency reuse information of each basic service set surrounding the station. The station obtains a parameter of the frequency reuse manner that is of the access point and that is adjusted by the access point. The parameter of the frequency reuse manner of the access point is adjusted by the access point according to scanned frequency reuse information of each basic service set surrounding the access point, a reuse policy, and the third message.

It should be noted that the foregoing third message is an extended neighbor report periodically sent by the station to the access point, and is used to report the frequency reuse information of each BSS surrounding the station to the access point. Based on an existing neighbor report, the extended neighbor report sent by the station may further supplement information about a BSSID in the report, for example, whether a BSS is a real BSS, and a corresponding region is a BSS edge region, or a BSS center region. An indication structure shown in FIG. 11 is an example of extended indication, and details are not described herein again. The foregoing frequency reuse information includes operating frequency bands of at least two virtual BSSs and a correspondence between a virtual BSSID and a real BSSID. The foregoing reuse policy refers to a frequency allocation method used by the access point to maximize a throughput of a BSS of the access point or to maximize a quantity of supported users in a current OBSS environment. Therefore, different reuse policies have different reuse methods. Common methods include but are not limited to the following rules:

If an orthogonal frequency allocation solution is used for an overlapping area, a frequency band that does not overlap that of an adjacent BSS is used for data transmitted by a station in an overlapping area between the BSS and the adjacent BSS; or if a solution of coordination between at least two BSSs is used for an overlapping area, an operating frequency band the same as that of an adjacent BSS is allocated for an overlapping area between the BSS and the adjacent BSS.

The foregoing overlapping area refers to an overlapping area between a real BSS (and a virtual BSS of the real BSS) and another real BSS (and a virtual BSS of the another real BSS).

Based on either of the foregoing two common methods, the reuse policy further includes the following content:

A frequency band used in a center region is determined by each access point; and there is at least one primary channel on an operating frequency band of each virtual BSS.

In this embodiment of the present invention, a station sends a third message to an access point, so that the access point adjusts a frequency reuse manner of the access point; and the station obtains a parameter of a frequency reuse manner that is adjusted by the foregoing access point, so as to flexibly switch a frequency band.

Based on the frequency reuse method in the foregoing embodiment, optionally, in the frequency reuse method provided in this embodiment of the present invention, the virtual BSS may not be introduced, but related information is carried in the Beacon or the another management frame, and is sent to the station, so that the station obtains at least two operating frequency bands of the BSS. In this case, a correspondence between the BSS and the at least two operating frequency bands is represented as: $BSS_m$: ($CH_{m0}$, $CH_{m1}$, . . . , $CH_{mk}$).

Accordingly, to better support this operating manner, the access point needs to have a primary channel on each operating frequency band, so that the station operating on the frequency band can learn information about the BSS without switching a frequency band. In this case, the station selects anyone of operating frequency bands decoded by the station or all operating frequency bands supported by the current access point as a communication frequency band of the station.

A BSSID of the BSS operating in fractional frequency reuse and the at least two operating frequency bands corresponding to the BSS need to be indicated in the extended neighbor report sent by the station. A specific implementation manner is similar to the description in the foregoing embodiment in FIG. 12, and details are not described herein again.

Optionally, this embodiment of the present invention may be further physically implemented by directly using at least two BSSs, and these BSSs are unified as one virtual BSS, for example, a current Dual-band (dual-band) implementation method in which 2.4 GHz and 5 GHz coexist is used. Accordingly, another implementation manner may be obtained by simply reversing the relationship between the real BSS and the virtual BSSs in the embodiment in FIG. 12. A specific step is similar to the description in the foregoing embodiment in FIG. 12, and details are not described herein again.

For ease of understanding, the following uses a specific application scenario to describe in detail the frequency reuse method according to this embodiment of the present invention.

The foregoing frequency reuse method may support both an existing WLAN terminal legacy STA and a new generation WLAN terminal NG STA.

For the NG STA, the NG STA receives a Beacon or another management frame sent by an access point. The Beacon or the another management frame carries related information indicating that a BSS is in a fractional frequency reuse mode. The related information includes operating frequency bands of at least two virtual BSSs and a correspondence between a virtual BSSID and a real BSSID. After the NG STA receives the Beacon sent by the access point, the NG STA sends a frame indicating whether the NG STA supports the fractional frequency reuse mode to the access point, and sends the frame to the access point. If the NG STA supports the fractional frequency reuse mode, the NG STA can learn a relationship between the virtual BSSID and the real BSSID.

After the access point determines that the NG STA supports the fractional frequency reuse mode, the NG STA may freely switch within an operating frequency band of the access point according to the at least two virtual BSSs, the operating frequency bands respectively corresponding to the at least two virtual BSSs, and a relationship between the virtual BSSs (for example, whether the virtual BSSs are corresponding to a same real BSS), provided that permission is granted by the access point. Likewise, the access point may also choose to simultaneously send data for the NG STA on the operating frequency bands of the at least two virtual BSSs, or switch an operating frequency band of the NG STA within the operating frequency band of the access point by using a management frame. For example, as shown in FIG. 10, an access point AP0 and an access point AP1 support fractional frequency reuse. The access point AP0 may operate on two frequency bands $CH_0$ and $CH_1$. $CH_0$ is a frequency band of a center region of the virtual BSS, a start frequency is $f_{00}$, and an end frequency is $f_{01}$. $CH_1$ is a frequency band of an edge region of the virtual BSS, a start frequency is $f_{10}$, and an end frequency is $f_{11}$. The access point may switch an original operating frequency band of the NG STA from $CH_1$ to $CH_0$ or from $CH_0$ to $CH_1$ by sending a management frame without re-associating the NG STA with the access point. In addition, the NG STA may obtain a frequency reuse manner that is of the access point and that is adjusted by the access point, so as to flexibly switch the frequency band. This embodiment of the present invention is not limited to two frequency bands. There may be k frequency bands (k=1, 2, 3, . . . , k), and a quantity of frequency bands is not limited.

The Legacy STA may also be supported. A communication process is similar to content used to describe the foregoing NG STA, and details are not described herein again.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An access point device, comprising:
   a memory; and
   a processor in communication with the memory, wherein the processor is configured to:
   send a first message to a station, wherein the first message carries indication information indicating that a basic service set is operating in a fractional frequency reuse mode;
   receive a second message sent by the station, wherein the second message carries indication information indicating that the station supports the fractional frequency reuse mode;
   communicate with the station in the fractional frequency reuse mode after determining, according to the second message, that the station supports the fractional frequency reuse mode;
   scan a channel to obtain frequency reuse information of each basic service set surrounding an access point; and
   determine a frequency reuse manner of the access point according to a reuse policy and the frequency reuse information, wherein the reuse policy is a frequency allocation manner used by the access point to maximize a throughput of a basic service set or to maximize a quantity of supported users in an overlapping area of a basic service set.

2. The access point device according to claim 1, wherein the processor is further configured to:
   when an orthogonal frequency allocation solution is used for the overlapping area, allocate a frequency band that does not overlap that of each basic service set surrounding the access point for the access point and an overlapping area of each basic service set surrounding the access point; or
   when a solution of coordination between at least two basic service sets is used for the overlapping area, allocate an operating frequency band the same as that of each basic service set surrounding the access point for the access point and an overlapping area of each basic service set surrounding the access point.

3. The access point device according to claim 1, wherein the processor is further configured to:
   receive a third message sent by the station, wherein the third message carries frequency reuse information of each basic service set surrounding the station;
   adjust the frequency reuse manner of the access point according to the reuse policy, the frequency reuse information of each basic service set surrounding the access point, and the third message; and
   send, to the station, a parameter of the adjusted frequency reuse manner.

4. The access point device according to claim 1, wherein the basic service set comprises at least two virtual basic service sets,
   wherein each one of the at least two virtual basic service sets corresponds to one virtual basic service set identifier,
   wherein each one of the at least two virtual basic service sets corresponds to an operating frequency band of the access point,
   wherein each one virtual basic service set identifier is associated with a real basic service set identifier, and
   wherein the real basic service set identifier is a Media Access Control (MAC) address of the access point.

5. A station device, comprising:
   a memory; and
   a processor in communication with the memory, wherein the processor is configured to:
   receive a first message sent by an access point, wherein the first message carries indication information indicating that a basic service set is operating in a fractional frequency reuse mode;
   send a second message to the access point, wherein the second message carries indication information indicating that a station supports the fractional frequency reuse mode;
   communicate with the access point in the fractional frequency reuse mode after the access point determines, according to the second message, that the station supports the fractional frequency reuse mode;
   send a third message to the access point, wherein the third message carries frequency reuse information of each basic service set surrounding the station; and
   obtain a parameter of a frequency reuse manner that is of the access point and that is adjusted by the access point,
   wherein the parameter of the frequency reuse manner of the access point is adjusted by the access point according to scanned frequency reuse information of each basic service set surrounding the access point, a reuse policy, and the third message, and
   wherein the reuse policy is a frequency allocation manner used by the access point to maximize a throughput of a basic service set or to maximize a quantity of supported users in an overlapping area of a basic service set.

6. The station device according to claim 5, wherein the basic service set comprises at least two virtual basic service sets, wherein each one of the at least two virtual basic service sets corresponds to one virtual basic service set identifier, wherein each one of the at least two virtual basic service sets correspond to an operating frequency band of the access point, wherein each one virtual basic service set identifier is associated with a real basic service set identifier, and wherein the real basic service set identifier is a Media Access Control (MAC) address of the access point.

7. A frequency reuse method, comprising:

sending, by an access point, a first message to a station, wherein the first message carries indication information indicating that a basic service set is in a fractional frequency reuse mode;

receiving, by the access point, a second message sent by the station, wherein the second message carries indication information indicating that the station supports the fractional frequency reuse mode;

communicating, by the access point, with the station in the fractional frequency reuse mode after the access point determines, according to the second message, that the station supports the fractional frequency reuse mode; and, wherein before sending, by an access point, a first message to a station;

scanning, by the access point, a channel, to obtain frequency reuse information of each basic service set surrounding the access point; and determining, by the access point, a frequency reuse manner of the access point according to a reuse policy and the obtained frequency reuse information of each basic service set surrounding the access point, wherein the reuse policy is a frequency allocation manner used by the access point to maximize a throughput of a basic service set or to maximize a quantity of supported users in an overlapping area of a basic service set.

8. The frequency reuse method according to claim 7, wherein determining a frequency reuse manner of the access point comprises:

when an orthogonal frequency allocation solution is used for the overlapping area, allocating a frequency band that does not overlap that of each basic service set surrounding the access point for the access point and an overlapping area of each basic service set surrounding the access point; or when a solution of coordination between at least two basic service sets is used for the overlapping area, allocating an operating frequency band the same as that of each basic service set surrounding the access point for the access point and an overlapping area of each basic service set surrounding the access point.

9. The frequency reuse method according to claim 7, further comprising:

receiving, by the access point, a third message sent by the station, wherein the third message carries frequency reuse information of each basic service set surrounding the station;

adjusting, by the access point, the frequency reuse manner of the access point according to the reuse policy, the frequency reuse information of each basic service set surrounding the access point, and the third message; and sending, by the access point and to the station, a parameter of a frequency reuse manner that is of the access point and that is adjusted.

10. The frequency reuse method according to claim 7, wherein the basic service set comprises at least two virtual basic service sets, wherein each one of the at least two virtual basic service sets corresponds to one virtual basic service set identifier, wherein each one of the at least two virtual basic service sets corresponds to an operating frequency band of the access point, wherein each one virtual basic service set identifier is associated with a real basic service set identifier, and wherein the real basic service set identifier is a Media Access Control (MAC) address of the access point.

11. A frequency reuse method, comprising:

receiving, by a station, a first message sent by an access point, wherein the first message carries indication information indicating that a basic service set is operating in a fractional frequency reuse mode;

sending, by the station, a second message to the access point, wherein the second message carries indication information indicating that the station supports the fractional frequency reuse mode;

communicating, by the station, with the access point in the fractional frequency reuse mode after the access point determines, according to the second message, that the station supports the fractional frequency reuse mode;

sending, by the station, a third message to the access point, wherein the third message carries frequency reuse information of each basic service set surrounding the station; and obtaining, by the station, a parameter of a frequency reuse manner that is of the access point and that is adjusted by the access point, wherein the parameter of the frequency reuse manner of the access point is adjusted by the access point according to scanned frequency reuse information of each basic service set surrounding the access point, a reuse policy, and the third message, and wherein the reuse policy is a frequency allocation manner used by the access point to maximize a throughput of a basic service set or to maximize a quantity of supported users in an overlapping area of a basic service set.

12. The frequency reuse method according to claim 11, wherein the basic service set comprises at least two virtual basic service sets, wherein each one of the at least two virtual basic service sets corresponds to one virtual basic service set identifier, wherein each one virtual basic service set is corresponding to an operating frequency band of the access point, wherein each one virtual basic service set identifier is associated with a real basic service set identifier, and wherein the real basic service set identifier is a Media Access Control (MAC) address of the access point.

* * * * *

UNITED STATES PATENT AND TRADEMARK OFFICE
CERTIFICATE OF CORRECTION

PATENT NO. : 11,234,133 B2
APPLICATION NO. : 15/436553
DATED : January 25, 2022
INVENTOR(S) : Yang It is certified that error appears in the above-identified patent and that said Letters Patent is hereby corrected as shown below:

In the Claims

Claim 6: Column 25, Line 5: "sets correspond to an operating frequency band of the" should read -- sets corresponds to an operating frequency band of the --.

Claim 12: Column 26, Lines 56-57: "wherein each one virtual basic service set is corresponding" should read -- wherein each one of the at least two virtual basic service sets corresponds --.

Signed and Sealed this
Tenth Day of May, 2022

*Katherine Kelly Vidal*
Katherine Kelly Vidal
*Director of the United States Patent and Trademark Office*